Jan. 9, 1962
C. T. KRAUSE
3,015,944
AUTOMATIC WASHER WITH CONTROL MEANS FOR
LIQUID SUPPLY AND HEATING
Filed Oct. 23, 1958
3 Sheets-Sheet 1
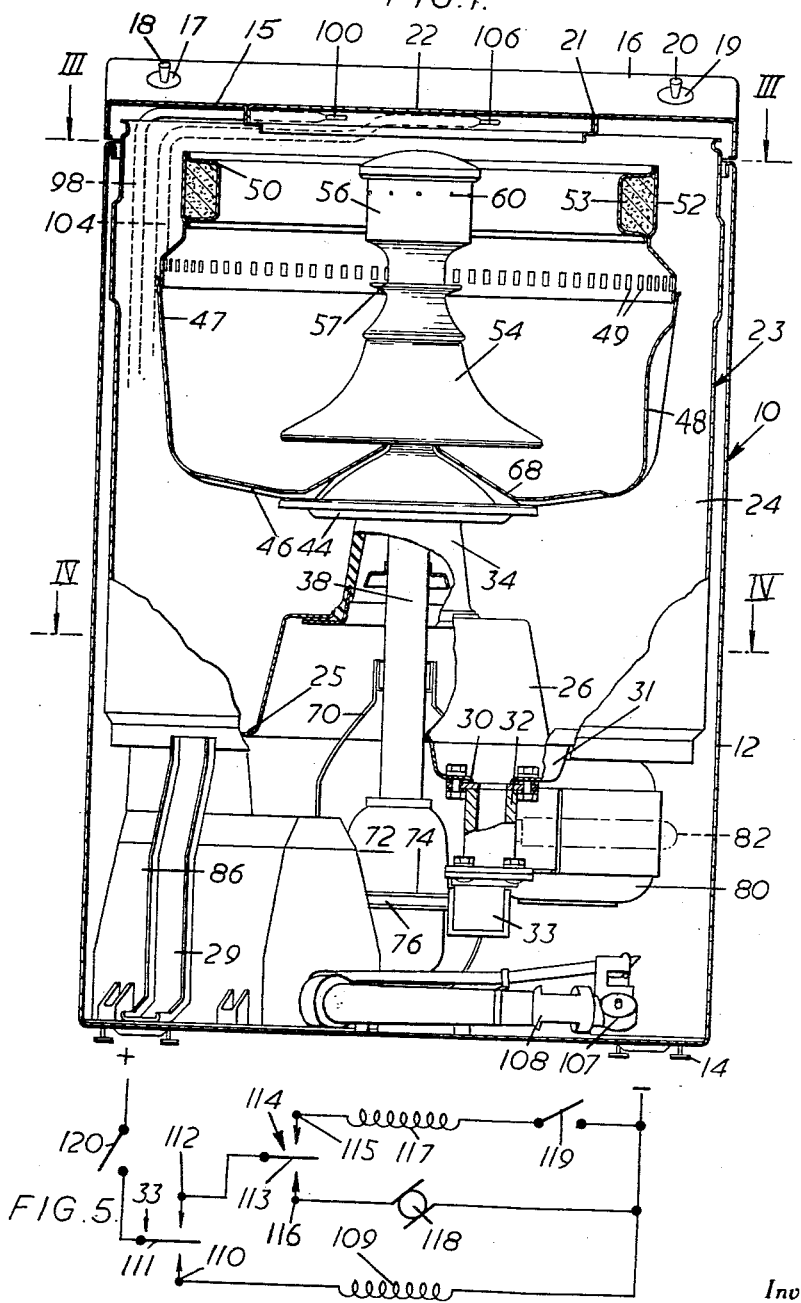
Inventor
CHARLES T. KRAUSE
By Edwin S. Dybvig
Attorney

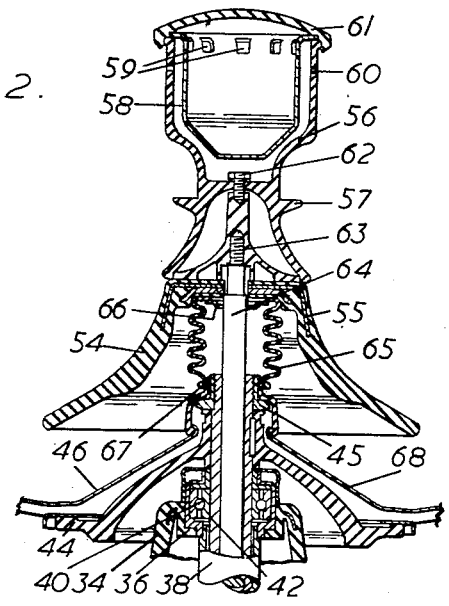
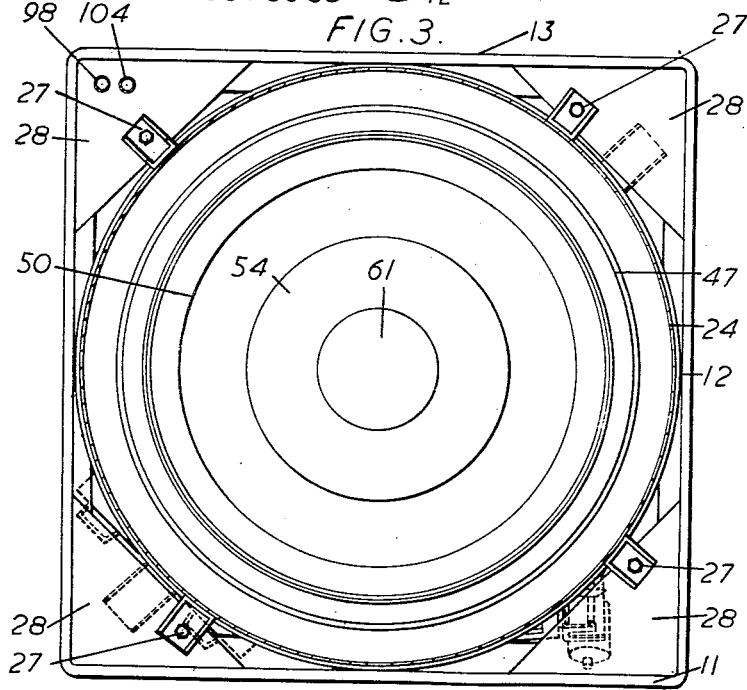

Jan. 9, 1962

C. T. KRAUSE 3,015,944

AUTOMATIC WASHER WITH CONTROL MEANS FOR
LIQUID SUPPLY AND HEATING

Filed Oct. 23, 1958

Inventor
CHARLES T. KRAUSE
By Erwin S. Dybvig
Attorney 3,015,944
AUTOMATIC WASHER WITH CONTROL MEANS FOR LIQUID SUPPLY AND HEATING
Charles Thomas Krause, Neuilly-sur-Seine, France, assignor to General Motors Corporation, Detroit, Mich., a corporation of Delaware
Filed Oct. 23, 1958, Ser. No. 769,127
Claims priority, application Great Britain Nov. 1, 1957
1 Claim. (Cl. 68—12)

This invention relates to washer machines.

Such a washer machine includes a rotatable clothes tub, a stationary water container to receive water overflow therefrom, a water inlet to the tub and a pump to draw water from the water container.

By the invention, the scope of which is defined by the appended claims, there is a simple means for heating the water prior to washing.

According to the invention, in such a washer machine, the pump is adapted to deliver water drawn from the water container through a heat exchanger to the tub.

Preferably the water inlet is under the control of a device responsive to the level of water in the water container. In this case, the device may be employed to initiate heating of the water in the heat exchanger responsive to a predetermined level of water in the water container.

Advantageously, the heating of the water in the heat exchanger is stopped responsive to the temperature of the water. In this case, the operation of a washing timer control may be initiated upon the cessation of heating.

How the invention can be carried into effect is hereinafter particularly described with reference to the accompanying drawings, in which:

FIGURE 1 is a vertical section, partly broken, through a washer machine according to the invention;

FIGURE 2 is a vertical section, to an enlarged scale, of part of FIGURE 1;

FIGURE 3 is a horizontal section on the line III—III of FIGURE 1;

FIGURE 5 is a circuit diagram of part of the electrical control system; and

Figure 4:
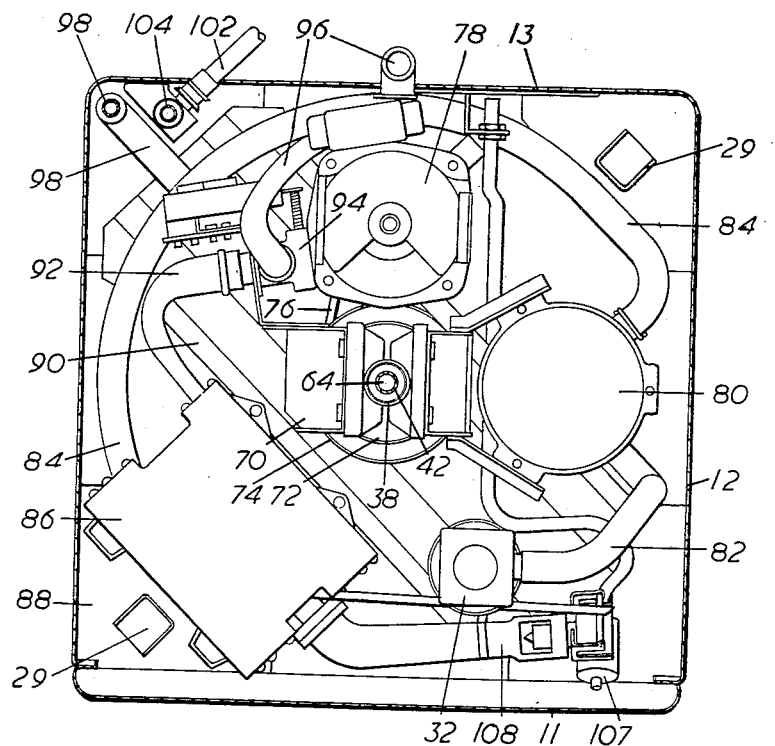
FIGURE 4 is a horizontal section on the line IV—IV of FIGURE 1 with water container removed.

The machine has an outer cabinet shell 10 with flanged front, side and rear walls 11, 12 and 13 (FIGURE 3) having on their lower edges adjustable feet 14 (FIGURE 1). The machine also has a top 15 having an inclined rear portion 16 on which are mounted respectively a water temperature dial 17 and its thermostat knob 18 and a timer control dial 19 and its timer knob 20. The top 15 also has a rectangular opening 21 with a lid 22 hinged to the edge of the top opening.

Within the cabinet shell 10 is a water container 23 having a vertical tubular portion 24 extending from the top of the cabinet and a bottom portion 25 which lies about two thirds of the way down the shell 10 and has a raised apertured central part 26. The tubular portion 24 is supported by brackets 27 (FIGURE 3) from the corner gussets 28 near the top of the cabinet shell and also on two legs 29 (FIGURES 1 and 4) from front and rear lower corners of the shell. An outlet aperture 30 in a depressed part 31 of the bottom portion 25 of the water container 23 leads to a tubular extension 32 at the bottom of which is located a pressure sensitive switch 33 which has a movable contact 111 movable from one fixed contact 110 to another fixed contact 112 when a predetermined quantity of water is in the extension 32 and water container.

Secured in and extending from the opening in the raised central part 26 (FIGURE 1) of the bottom portion 25 of the water container 23 is a truncated cone-shaped resilient member 34 of synthetic or natural rubber. The upper end of the resilient member 34 is connected to a flange 36 on a tubular support 38. Rotatably mounted in the tubular support 38 by bearings 40 is a tubular shaft 42, the upper end of which is connected to a hub 44 to which a tub 46 is connected and sealed. The tub 46 has an outer wall 47 in the form of a truncated cone with a plurality of vertical indentations 48 therein. There is a series of apertures 49 adjacent the upper periphery of the tub and an upper rim 50 of reduced diameter to prevent the loss of clothes during spinning. To reduce vibration of the mechanism during spinning of the tub, the upper rim has a hollow annular housing 52 filled with metal particles 53 to constitute a flywheel.

Within the tub is a flared agitator 54 which is bell-shaped and has an inner metal reinforcement 55 in its upper portion. The agitator is reciprocable through a distance of about seven-eighths of an inch and to prevent clothes from being caught there is a clearance of about one-and-a-quarter inches between the bottom of the flared agitator 54 and the bottom of the tub 46. On top of the agitator a soap dispenser 56 extends above water level and has an external annular rib 57 which agitates and aerates the liquid in the upper portion of the tub and during rinsing disperses and dissolves any light foreign matter on the top of the liquid. The top of the soap dispenser 56 is hollow and contains a cup 58 for bleach having a series of holes 59 in its side wall. The side wall of the hollow top is also apertured at 60 and the top closed by a cap 61. The soap dispenser 56 is fastened by a bolt 62 in the base of the hollow top to a bell-shaped cap nut 63 on a threaded portion at the top of an agitator reciprocator shaft 64 slidable in the tubular shaft 42. The cap nut 63 clamps the top of the flared agitator 54 and the top of a flexible rubber bellows seal 65 against a washer 66 bearing on the reciprocator shaft. The bottom of the bellows seal 65 is sealed by a wire ring 67 to a nut 45 threaded on the top of the tubular shaft 42, and the bellows seal 65 extends downwardly below this nut 45 to overlap and be clamped to an outwardly curled central conical portion 68 of the tub.

The tubular support 38, towards its lower end, carries a yoke comprising two arms 70 which surround a rotatable housing 72 of a drive mechanism. The drive mechanism, which is fully described in the complete specification of United States Patent No. 2,758,685, is adapted to rotate the tubular shaft 42 and reciprocator shaft 64 together at spinning speed upon rotation of the rotatable housing 72 in one direction and to hold the tubular shaft 42 stationary and reciprocate the reciprocator shaft 64 upon rotation of the rotatable housing 72 in the opposite direction.

The rotatable housing 72 has an integral external V-grooved pulley 74 which receives a V-belt 76 by which the housing 72 can be rotated in either direction. The V-belt 76 passes around a V-groove drive pulley (not shown) on the lower end of the shaft of a main reversible electric motor 78.

A water pump motor 80 is supported from an arm 70 of the yoke and its shaft (not shown) has secured thereto an impeller of a centrifugal pump (not shown). The pump has an inlet connected to an outlet tube 82 from the tubular extension 32 on the water container 23. If the impeller is rotated by the water pump motor 80, the discharge flow is through a discharge tube 84 connected between the outlet of the pump and the inlet of a heat exchanger 86. The heat exchanger 86 is supported on a gusset 88 in a lower corner of the shell 10 and on a diagonal cross brace 90.

The outlet of the heat exchanger 86 is connected by a conduit 92 to the inlet of an electro-magnetically operated two-way valve 94, whose outlets lead respectively to a drain outlet pipe 96 and to a riser pipe 98 which extends up the back of the shell 10 to a pump water nozzle 100 directed into the tub 46 above the upper rim 50 thereof.

The washer can be supplied with cold water through a cold water supply pipe 102 under the control of an electromagnetically operated water valve (not shown) and an inlet pipe 104 adjacent the riser pipe 98 which extends to an inlet nozzle 106 above the upper rim 50 to discharge water into the tub 46. The electromagnet 109 of the water valve is in circuit with the fixed contact 110 of the pressure sensitive switch 33, so that when there is insufficient water in the tubular extension 32, the water valve is opened and when the movable contact 111 of the switch 33 is moved by water pressure, the electromagnet is de-energised and the water valve closed. The other fixed contact 112 of the pressure sensitive switch 33 is in circuit with a movable contact 113 of a temperature sensitive switch 114, which has two fixed contacts 115 and 116. The fixed contact 115, the low temperature contact, is connected to an electromagnet 117 of an electromagnetically operated gas valve 107 and the other fixed contact 116, the high temperature contact is connected to a timer motor 118.

The heat exchanger 86 includes a gas burner 108 connected to be supplied with gas through the gas valve 107 which is under the control of the temperature responsive switch 114 whose temperature-responsive element is located in the water outlet of the heat exchanger 86. The setting of the temperature responsive switch 114 is adjustable by means of the thermostat knob 20. A bypass to the gas valve 107 leads to a pilot light for the gas burner of the heat exchanger. The pilot light has a bi-metallic element responsive to the heat of the flame of the pilot light. In the absence of a flame, the bi-metallic element opens a switch 119 in the circuit of the electromagnet 117 of the gas valve 107 so as to prevent opening of the latter. The products of combustion of gas in the heat exchanger may be removed in any conventional manner from the rear of the machine. A portion of the bottom of the front wall of the shell is made removable so that the gas valve and pilot light are accessible for adjustment and ignition.

When the water in the outlet of the heat exchanger 86 reaches the chosen temperature, the movable contact 113 of the temperature responsive switch 114 moves off the low temperature fixed contact 115, closing the gas valve, and engages the high temperature fixed contact 116 to complete a circuit to the timer motor 118.

The timer motor 118 has a timer control shaft (not shown) connected to the timer knob 20. The timer control shaft is manually rotatable to set the start of the timer period and is rotated by the timer motor 118 when the latter is energised. The timer control shaft is also movable upwardly to open a switch 120 in the circuit to the switch 33 and downwardly to close the switch 120.

*Operation*

The washer is first filled with about nine pounds of clothes, preferably in four evenly spaced groups in the tub, and detergent is added to the tub. The thermostat knob 18 is turned to the desired water temperature. The timer control shaft is then turned to the desired wash period and depressed by means of the timer knob 20. This closes the switch 120 and completes the circuit to the pressure sensitive switch 33 and the electromagnet 109 of the water valve. In the absence of water from the tubular extension of the water container, the contact 111 of the pressure sensitive switch 33 is on the contact 110 and the electromagnet 109 is accordingly energised to open the water valve to supply water through the inlet nozzle 106 to the tub 46. At the same time the pump is driven by the pump motor 80, but, in the absence of water from the tubular extension 32, is ineffective.

Water continues to flow through the inlet nozzle 106 to fill the tub 46 and overflow through the tub apertures 49 into the water container 23. This overflow passes into the depressed part 31 of the bottom portion 25 of the water container 23 and through the outlet aperture 30 to the tubular extension 32, whence it is drawn by the pump for discharge through the heat exchanger 86, riser pipe 98 and nozzle 100 back into the tub 46.

The level of water in the tubular extension 32 is prevented from rising by the action of the pump until water commences to flow through the nozzle 100 into the tub, thus indicating that the heat exchanger 86 and riser pipe 98 are full of water. Thereafter the flow of water through both nozzles 100 and 106 causes an increased overflow from the tub 46 and the level of water in the tubular extension 32 rises. When the water level in the tubular extension 32 and water container has risen sufficiently, the pressure sensitive switch 33 is operated to move the contact 111 off the contact 110, thus opening the circuit to the electromagnet 109 which is de-energised and closes the water valve. The contact 111 engages the contact 112 and the circuit is completed to the switch 114. As the temperature of the water is low, the contact 113 is in engagement with the contact 115 and the circuit to the electromagnet 117 of the gas valve 107 is completed. This ensures that no heating takes place until and unless the heat exchanger and associated pipes are full of water.

Provided the pilot jet is alight, the switch 119 is also closed and energisation of the electromagnet 117 causes the gas valve 107 to open and gas is burnt in the heat exchanger 86 to heat the water pumped therethrough by the pump. The water continues to be circulated by the pump through the heat exchanger 86, riser pipe 98 and pump water nozzle 100 into the tub 46, whence it overflows into the water container and passes back to the pump. When the water in the outlet of the heat exchanger 86 reaches the temperature set by the thermostat knob, the temperature responsive element of the switch 114 moves the contact 113 off the contact 115 to engage the contact 116. This breaks the circuit to the electromagnet 117 and the gas valve closes. The circuit to the timer motor 118 is completed.

The timer motor 118 commences to rotate the timer control shaft which carries a cam to open and close in turn various switches of the timer control to effect the various wash, spin and rinses phases of the timer cycle. The precise arrangement of the latter forms no part of this invention and is referred to below as one example only.

Initially, the drive mechanism is driven by the motor 78 in a direction to effect reciprocation of the reciprocator shaft 64 and agitator 54 for a wash period of up to fifteen minutes as set by the initial position of the timer knob 20. The pump motor 80 continues to operate to circulate hot suds water. At the end of the wash period, the main motor 78 is reversed to effect rotation of the tubular shaft 42 and tub 46 and the reciprocator shaft 64 and agitator 54 for a spin period of 2 minutes. This removes water from the clothes and tub 46. During the spin period, the pump motor 80 is inactive and the suds water accumulates in the water container 23.

After a pause of three minutes during which bleach can be added to the cup 58 in the soap dispenser 56, the timer starts a water fill period of a first rinse phase, if the suds water is not to be re-used. During the first rinse phase, the electromagnet 109 is energised to open the water valve through a timer-controlled circuit independent of the switch 33 for a period of 7 minutes, the pump motor 80 is energised and the two-way valve 94 is operated to connect the conduit 92 from the outlet from the heat exchanger 86 to the drain outlet pipe 96. The suds water is pumped from the water container 23 to the drain outlet pipe 96 and the tub 46 is filled with fresh water, any overflow into the container 23 being pumped to the drain outlet pipe 96. After 4 minutes, the main motor 78 is energised for 3 minutes to effect reciprocation of the agitator 54. After the first rinse phase, a spin period of 2 minutes follows, during which the main motor 78 is reversed to effect rotation of the tub 46 and agitator 54, the water valve is closed by de-energisation of the electromagnet 109 and the pump and two-way valve 94 operated to empty the water container 23.

The timer then starts a second rinse phase of 7 minutes similar to the first rinse phase. Thereafter a final spin period similar to the spin period after the first rinse phase occurs, but continues for 5 minutes in order to remove substantially all the water from the clothes in the tub 46.

The timer control shaft is then moved upwardly to open the switch 120 to break the main circuit.

It will be understood that the timer may be so constructed as to require manual restarting after each spin period or may pass automatically to the next phase.

Figure 6:
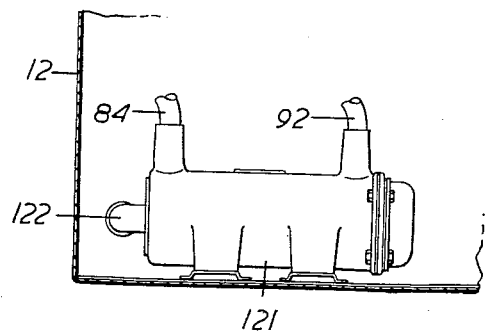
FIGURE 6 is a front elevation of an alternative form of heat exchanger for a washer machine as shown in FIGURE 1.

In place of the gas heated heat exchanger 86, a simple electrically heated heat exchanger 121 may be used as shown in FIGURE 6. The heat exchanger 121 has an inlet connected to the discharge tube 84 and an outlet connected to the conduit 92, and contains immersion heaters 122 extending into the path of the water between the inlet and outlet. The immersion heaters 122 are under the control of a relay-operated switch whose relay is substituted for the electromagnet 117 and switch 119 in the circuit of FIGURE 5. Thus the energisation of the immersion heaters is controlled by the temperature responsive switch 114 and the pressure sensitive switch 33.

In a non-automatic version of the washer machine, the inlet of water is under the control of a manually operated switch and the pressure sensitive switch is eliminated. Water is admitted by operation of the switch and when water is emerging from both inlet and pump water nozzles 106 and 100, the supply of water is cut off manually and the heat exchanger is energised by another manually operated switch. The tempreaature responsive switch can be eliminated if a safety overheat cut off device is incorporated in the heat exchanger and a temperature indicator is provided. The heat exchanger is manually deenergised when the water temperature is correct. Thereafter a manually operated cam, similar to the timer control shaft cam but without the timer motor drive, is operated to give manually chosen wash, spin, rinse and pause periods as required.

What is claimed is as follows:

In combination with a washer machine including a rotatable liquid holding clothes tub, an oscillatable agitator in said tub, a controllable liquid inlet to said tub having a solenoid actuator, a stationary liquid container beneath said tub for receiving liquid overflow from said tub, a pump having an inlet connected to receive liquid from said container and an outlet, a controllable heat exchanger having an inlet connected to said pump outlet and an outlet for delivering liquid into said tub and a heating means, a control circuit comprsinig a power source, a timer motor for controlling the rotation of said tub, the oscillation of said agitator and the operation of said pump, a pressure sensitive device having a first switch connected to said power source and responsive to the level of liquid in said container, said first switch having a high liquid level contact position for stopping liquid flow through said liquid inlet and for conditioning said heating means in said heat exchanger for energization and a low liquid level contact position connected to said solenoid actuator, and a temperature responsive device having a second switch adjustably responsive to the temperature of the liquid in said heat exchanger outlet, said second switch being connected to said high liquid level contact and having a high temperature contact position connected directly to said timer motor for stopping heating in said heat exchanger and energizing said timer motor and a low temperature contact position connected directly to said heating means for initiating heating in said heat exchanger.

References Cited in the file of this patent
UNITED STATES PATENTS

| | | |
|---|---|---|
| 1,077,330 | Clarke | Nov. 4, 1913 |
| 1,656,139 | Breton | Jan. 10, 1928 |
| 2,173,564 | Osuch | Sept. 19, 1939 |
| 2,413,954 | Counterman | Jan. 7, 1947 |
| 2,421,803 | Neal | June 10, 1947 |
| 2,509,753 | Woodson | May 30, 1950 |
| 2,565,150 | Stageberg | Aug. 21, 1951 |
| 2,617,435 | Kessler | Nov. 11, 1952 |
| 2,621,797 | Smith | Dec. 16, 1952 |
| 2,693,097 | Chatelain | Nov. 2, 1954 |
| 2,803,124 | Howlett et al. | Aug. 20, 1957 |
| 2,914,935 | Sampsel | Dec. 1, 1959 |

FOREIGN PATENTS

| | | |
|---|---|---|
| 163,257 | Australia | June 8, 1955 |